Patented Jan. 20, 1942

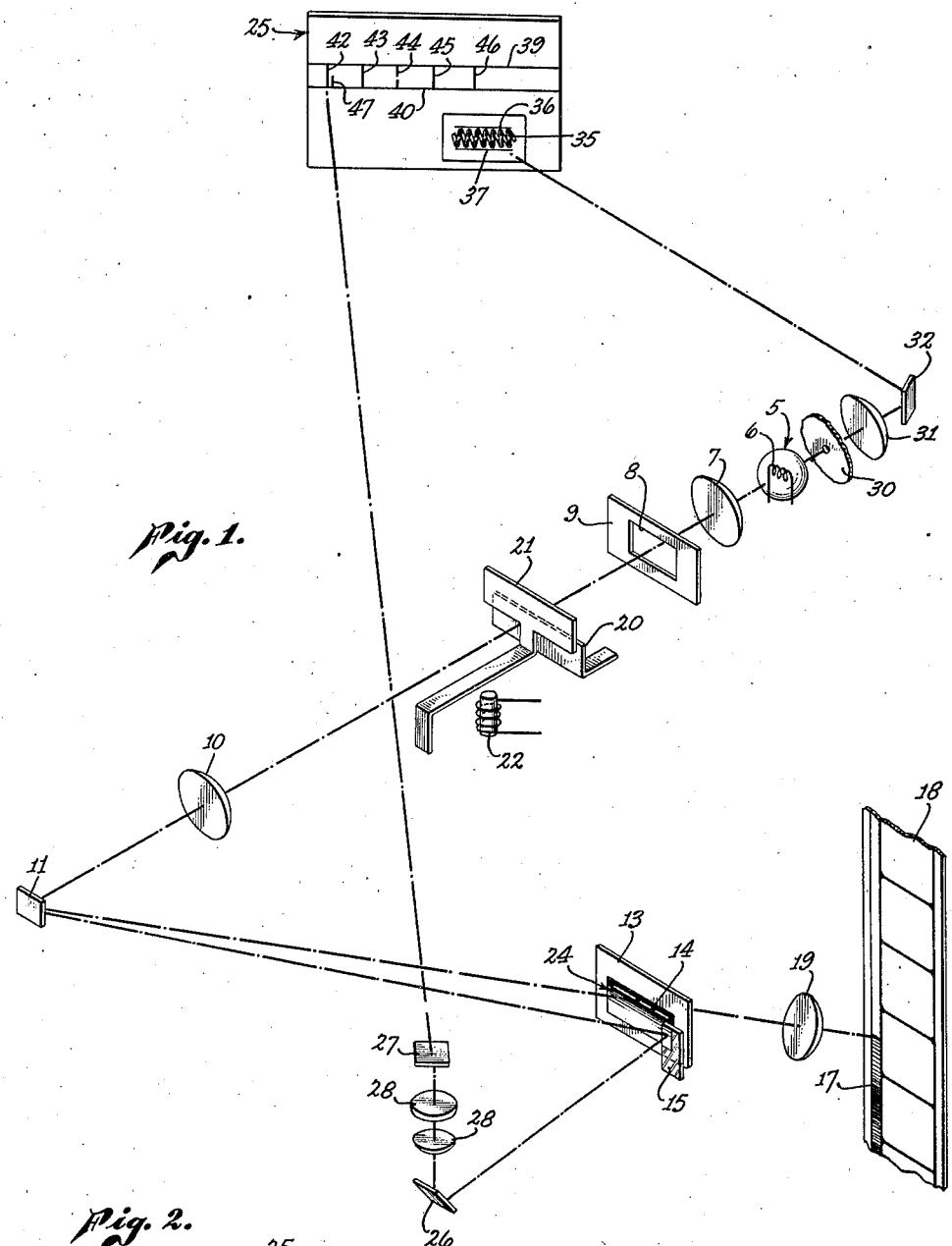

2,270,350

UNITED STATES PATENT OFFICE 2,270,350

MONITORING SYSTEM FOR SOUND RECORDING

Max T. Schomacker, West Los Angeles, Calif., assignor to Radio Corporation of America, a corporation of Delaware Application September 1, 1939, Serial No. 293,086

7 Claims. (Cl. 179—100.3)

This invention relates to sound recording apparatus and particularly to an improved method of and means for monitoring a variable density recording system employing ground noise reduction.

In Dimmick Patents No. 2,095,317 and No. 2,095,318, patented October 12, 1937, there are disclosed methods of and apparatus for variable density sound recording by what is known as the "penumbra" method, wherein an opaque mask produces a graduated intensity beam of light which is vibrated across a mask having a slit so positioned therein as to select an appropriate portion of the beam which is thereafter directed on to a sensitive film.

In both of the systems described in these patents, ground noise reduction may be applied, and specific apparatus for this purpose is shown in Fig. 7 of the latter of the patents. In copending application Serial No. 210,592, filed May 28, 1938, a type of penumbra variable density recording system having a definite end value of the shutter opening with increased modulation has been disclosed. This is accomplished by increasing the bias current with increased modulation and providing optical means for determining the end position of the shutter movement.

In the penumbra type of recording system it is particularly important that the light source, which usually consists of a coil filament lamp, be accurately positioned with respect to the optical axis of the recording system so that the graduated intensity light beam remains properly graduated during recording. Since the variation in intensity of the beam, transversely of the slit, directly affects the light reaching the film for given signal amplitudes, the quality of the beam must remain constant for optimum results. That is, the beam graduations must be such as to provide a linear relationship between the light intensity and signal amplitudes when the normal recording range is over the H and D curve of the film emulsion. One type of such a light source is disclosed and claimed in copending application Serial No. 156,681, filed July 31, 1937.

The present invention is directed to a monitoring system which not only provides an indication of the position or setting of the graduated intensity beam with respect to the slit in the slit mask but also an indication at all times of the exact position of the lamp filament with respect to the optical axis of the recording system. Monitoring systems for recording lamp filaments are well known in the art, as disclosed in Stack Patent No. 2,166,186 of July 18, 1939, this type of system, however, failing to provide an indication of the position of the lamp filament with respect to the remainder of the optical elements.

The principal object of the present invention, therefore, is to facilitate the testing and adjustment of the optical elements of a sound recording system.

Another object of the invention is to provide a combination modulation and light source indicator for observing the condition of a sound recording system during the operation thereof.

A further object of the invention is to provide a monitoring system for a variable density recording system wherein the light source, with respect to the optical system, is indicated at all times simultaneously with the indication of the action of the recording modulator.

Another object of the invention is to facilitate the adjustment of the optical elements of a penumbra variable density recording system.

Although the novel features which are believed to be characteristic of this invention are pointed out with particularity in the claims appended herewith, the manner of its organization and the mode of its operation will be better understood by referring to the following description read in conjunction with the accompanying drawing forming a part thereof, in which Figure 1 is a diagrammatic view of a variable density recording system showing the monitoring system of the invention, and Figure 2 is an elevational view showing the appearance of a light source out of adjustment.

Referring now to Fig. 1, an exciter lamp 5, with its coil element 6, produces light which is collected by a lens 7 and directed through an aperture 8 of a mask 9. The rectangular beam is then directed through a lens 10 to a mirror 11 of the modulation galvanometer on which the filament is imaged. From the mirror 11 the beam is reflected to a slit mask 13 having a slit 14 therein and upon which the aperture 8 is imaged and attached to which is a mirror 15 as shown. Emergent light from the slit 14 is directed to the sound track portion 17 of a film 18 by an objective lens 19.

Positioned intermediate mask 9 and lens 10 is a fixed stop shutter 20 and a movable penumbra shutter 21 adapted to be moved vertically by energy applied to a solenoid 22 from a rectifier amplifier as disclosed in the above-mentioned copending application Serial No. 210,592, filed May 28, 1938. The effect of shutter 21 is to produce a beam of light graduated in intensity, as indicated at 24, on the mask 13. As the mirror 11 is vibrated, the beam of light 24 moves transversely across the slit 14 in accordance with the signal being recorded.

Since the mask 21 is moved by the average value of the signal currents and is initially set so that at times of no signal very little, if any, light passes to the film, the average density of the negative will vary with the amplitude of the signal. A print made from such a negative will, of course, be nearly opaque at times of no signal with an increasing average transparency as the signal level increases.

Positioned on or immediately in front of the mask 13 is a mirror 15 which projects a portion of the light beam by means of mirrors 26 and 27 and lenses 28 to a monitor card 25. The optical elements 15, 26, 27 and 28 are so arranged as to image the edges of shutters 20 and 21 upon the card 25. As the lower edge of the beam 24 moves over the mirror, the beam similarly moves across card 25 as will be explained hereinafter. At the same time, light from the filament 6 is obtained directly from the lamp along the recording optical axis through an aperture in plate 30. The emergent light from the plate 30 images the filament 6 on the monitor card 25 by a lens 31 and a reflector 32.

In the case of the filament image, as shown at 35, it is to be noted that it lies between two horizontal lines 36 and 37, which have been found by test to be the tolerance limits which produce the correct graduation and position of the beam upon the mask 13. Should the filament sag or the lamp be positioned below or above the optical axis its condition will be indicated on the card in a manner such as shown in Fig. 2. Thus, the operator at all times has before him not only an indication of the condition of the filament, such as short circuited turns, but also an indication of the exact position of the filament with respect to the optical axis of the recording system. He, therefore, knows at a glance the exact location of his graduated beam and its quality.

In the area on the card 25 above the lamp image there are shown two parallel lines 39 and 40 with a series of five vertical lines 42, 43, 44, 45 and 46 with a vertical line 47 of one-half the length of the others. These lines are for the purpose of indicating the proper adjustment of the shutters 20 and 21 with respect to the light image reaching the mask 13, to insure the proper initial adjustment of the noise reduction shutters 21 and 20 and the extent of the modulation of mirror 11. The line 42 shows the correct adjusted position of the upper edge of the beam so that it coincides with the slit 14. At this point the light to the film should be substantially zero. The line 47 shows the position to which shutter 21 should be adjusted at times of no signal which is sufficient illumination to place the exposure at the lower point of the H and D curve of the negative, while line 43 shows the position of the shutter 21 when it has travelled one-half the distance to the fixed shutter 20. This point 43 thus corresponds to a light intensity which lies at the center or mid-point of the linear position of the H and D curve of the negative emulsion and about which full modulation occurs. The broken line 44 represents the point where the upper edge of the shutter 21 coincides with the upper edge of fixed shutter 20 or the upper limit of the linear portion of the H and D curve of the negative. The line 45 shows a 50 percent over-exposure of the film and line 46, a 100 percent over-exposure. These over-exposure indications are desirable to provide the operator with knowledge of the extent of the over-exposures during high signal levels.

Thus, the present monitoring system with the light beam being picked up by the mirror 15 and moving horizontally across the observation card 25, indicates actual operating conditions during recording and, as mentioned above, will provide means for adjusting the optical elements of the system to their settings. Also, by simultaneously imaging the filament along optical axis coaxial with the recording optical axis, the position and quality of the beam is observed together with the condition of the incandescent element of the light source.

I claim as my invention:

1. A sound recording system comprising a source of light having an incandescent element therein, means for obtaining a penumbra shadow light beam from said source, means for projecting said shadow through an optical system to a motion picture film, means for vibrating said shadow in accordance with a signal to be recorded, and means for simultaneously obtaining a second light beam from said source coaxially with the optical axis of said optical system for the observation of the condition and position of said incandescent element which provides the light for said penumbra shadow.

2. A sound recording system comprising a source of light, means for producing a penumbra shadow light beam of predetermined dimensions from said source, means for projecting said beam to a motion picture film, said beam passing a plurality of optical elements along a definite axis, and means for collecting a light beam along an axis coaxial with respect to said first axis for determining the position of said light source which provides the light for said penumbra shadow, said last-mentioned means including an aperture forming plate and cooperating lens positioned coaxially with the optical axis of said projecting means.

3. A sound recording system comprising a source of light, means for forming a penumbra shadow light beam from said source, means for projecting said shadow along a definite optical axis to a motion picture film, means for vibrating said light shadow in accordance with signals to be recorded, means for projecting a portion of the light shadow projected toward said film to an observation medium for determining the position of said light shadow with respect to said film, and light beam forming means positioned coaxially with the optical axis of said projecting means for projecting a second light beam directly from said source coaxially with said recording penumbra shadow axis for observing the condition and position of said light source which provides the light for said penumbra shadow.

4. A method of indicating the condition and position of a light source used for producing a penumbra shadow for recording sound waves comprising utilizing light from said source along an optical axis coaxial with respect to the recording optical axis of said penumbra shadow for obtaining an image bearing a predetermined relationship with respect to said recording optical axis.

5. A sound recording system comprising a light source having an incandescent element therein, a mask for forming light from said element into a beam, a shutter in the path of said beam for producing a penumbra shadow, means for selecting a portion of said penumbra shadow for impingement on said film, means for projecting a portion of said shadow projected toward said film to an observation medium to indicate the position of said beam, a second mask positioned along the optical axis of said first beam to form a second beam, and means for projecting said second light beam along the optical axis of said recording system to said observation medium.

6. A recording system in accordance with claim 5 in which said observation medium also indicates the intensity of the penumbra shadow of said first beam passing to said film and the position of said incandescent element with respect to the optical axis of said first light beam.

7. A sound recording system comprising means for producing a penumbra shadow of predetermined proportions along a definite optical axis, means for producing a light beam along an optical axis coaxial with said first mentioned optical axis, means for observing the condition and position of said penumbra shadow producing means with respect to said optical axis, and means for observing the intensity of certain portions of said shadow.

MAX T. SCHOMACKER.